Sept. 29, 1959  A. LESNEWICH  2,906,861
MULTIPLE ARC WELDING
Filed Sept. 16, 1957

*INVENTOR.*
ALEXANDER LESNEWICH
BY H. Hume Matthews
Edmund W Bopp
ATTORNEY & AGENT United States Patent Office 2,906,861
Patented Sept. 29, 1959

2,906,861

MULTIPLE ARC WELDING

Alexander Lesnewich, New Providence, N.J., assignor to Air Reduction Company, Incorporated, New York, N.Y., a corporation of New York Application September 16, 1957, Serial No. 684,396

9 Claims. (Cl. 219—135)

This invention relates to electric arc welding with a plurality of consumable electrodes. It is described herein as applied to consumable electrode inert gas shielded arc welding, although in its broader aspects, it is applicable to other types of arc welding.

There are many welding applications in which it is desirable to take advantage of the high weld metal deposition rate of simultaneous plural arcs struck to a plurality of consumable electrodes. By way of example, it may be desired to deposit a layer of relatively hard, long wearing material, e.g., aluminum bronze, on a body of softer material, e.g., steel. Conversely, it is sometimes desired to deposit a layer of softer metal on a hard body. It has been proposed to deposit metal for these purposes by welding techniques, including electric arc welding. Such an operation is commonly called overlaying or surface welding.

In suface welding, it is essential that the heat of the weld melt only enough of the underlying body to ensure a good bond. If there is any deeper penetration, the material of the underlying body may dilute the surface material and alter the characteristics of the overlay.

It is common in surface welding to use a welding machine which establishes a fixed rate of travel of the arc along the workpiece, and also to use an automatic continuous electrode wire feed synchronized with the rate of travel, in order to ensure an even coating of the deposited layer.

An electric welding arc moves along a linear path with respect to a workpiece, and deposits on the workpiece a band of metal which extends only to a limited distance on either side of that path. Surfacing operations commonly are required to cover areas whose width is substantially greater than the width of the band deposited by a single arc moving along a straight path. In order to avoid the necessity for repeated passes of the arc to cover an area of substantial width, various techniques have been developed to increase the width of the band deposited by a single arc. One of these techniques is to oscillate the arc alternately to opposite sides of a straight path along the workpiece. The maximum practical amplitude of oscillation is limited, however, and consequently the maximum band width which can be deposited by that technique is likewise limited.

Another technique is to use two arcs formed by two welding heads mounted side-by-side on a carriage, and moved side-by-side across the workpiece, with or without simultaneous oscillation of the carriage.

In a preferred arrangement of two arcs, the arcs are series connected. In this way the two arcs are of opposite polarity, have a tendency to repel one another, and may be operated close together without merging, as in the case of arcs of the same polarity.

While the twin series-connected arcs are effective to widen the deposited band, they lead to operational difficulties concerned with the starting of the arcs. These difficulties are encountered particularly with low resistance electrode materials such as aluminum and copper, although they may, upon occasion, be encountered with almost any consumable electrode material particularly when using alternating current series arcs.

Single direct current welding arcs are commonly started by bringing a continuously fed welding electrode into contact with the workpiece. The arc may then start either by a vaporization or flashing of some protuberance at the electrode tip (commonly called a contact type start), or by resistance heating of the electrode by the large current surge which occurs because of the absence of an arc load on the source of energy, with resulant melting and collapse of a section of the electrode close to the workpiece (commonly called a fuse type start).

Various techniques are employed to assist in starting a welding arc. One such technique is to trim or otherwise form the end of the electrode wire to a sharp point to give a contact type start. Another technique is to use a small ball of steel wool between the electrode and the workpiece. The steel wool, being high resistance material with small diameter filaments, melts readily and gives a fuse type start.

The problems of arc starting are intensified in the case of alternating current welding arcs, since the arc is extinguished twice during every cycle, and must reestablish itself. While in most instances, there are sufficient ionized and highly heated particles remaining between the electrode and the workpiece so that the arc is reestablished without difficulty, nevertheless the fact that the arc is extinguished so frequently leads to occasional difficulty in restarting the arc. A common technique is to employ a superimposed high frequency, high voltage component (of the order of 10 kilocycles up to several megacycles at 1000 to 2000 volts, for example), which breaks down the arc gap with a spark, providing a path for the heavy current arc to follow. This technique, although effective, is undesirable because of interference with radio and other communications facilities.

When twin series-connected arcs are employed for overlay work it is preferred that the wire feeds of the two arcs be driven synchronously, in order to ensure uniform coating of the surface. It is highly desirable to start the arcs simultaneously, or as nearly so as possible. However, as a practical matter, one electrode must in fact contact the work before the other. With a straight series connection (current path from the first electrode to the work and thence to the second electrode) there is no potential between the first electrode and the work when the first electrode touches the work because the circuit is open between the work and second electrode. As a result no arc can start between the first electrode and the work and the first electrode has an opportunity to make good electrical contact with the work by "stubbing" (the stalled feed motor urging the electrode end into firm contact with the work) or by coiling up in sliding contact with the work as the wire feed continues to push wire down against the work. The contact of the first electrode against the work places the open circuit voltage of the welding machine across the gap between the work and the second electrode. When the second electrode contacts the work its arc will start by one of the arc starting mechanisms previously described. However, since good electrical contact has already been made between the first electrode and the plate there is no opportunity for the first arc to start except by fuse action in the full cross section of the wire. With wires of high electrical conductivity fuse action of this type does not occur and the second arc will not start. Even if the arc does eventually start the weld may be spoiled by the welded on unfused wire that remains.

An object of the invention is to provide improved methods and apparatus for welding utilizing twin series-connected arcs.

Another object is to provide improved methods and apparatus for starting series-connected arcs, particularly where the electrode wire is of high electrical conductivity and the electrode wire is fed without interruption.

The foregoing and other objects of the invention are attained by providing a source of welding current having an electrical center tap, and connecting the respective arcs between the respective end terminals of the source and the center tap. Instead of a single source with a center tap, twin sources with a common terminal may be used. When so connected, complete independent electrical paths are provided to start each arc as a single arc, but, when started, the arcs run as series arcs, with substantially no current flow in the common line.

Other objects and advantages of the invention will become apparent from a consideration of the following description and claims, taken together with the accompanying drawing.

FIGURE 1

Figure 1:
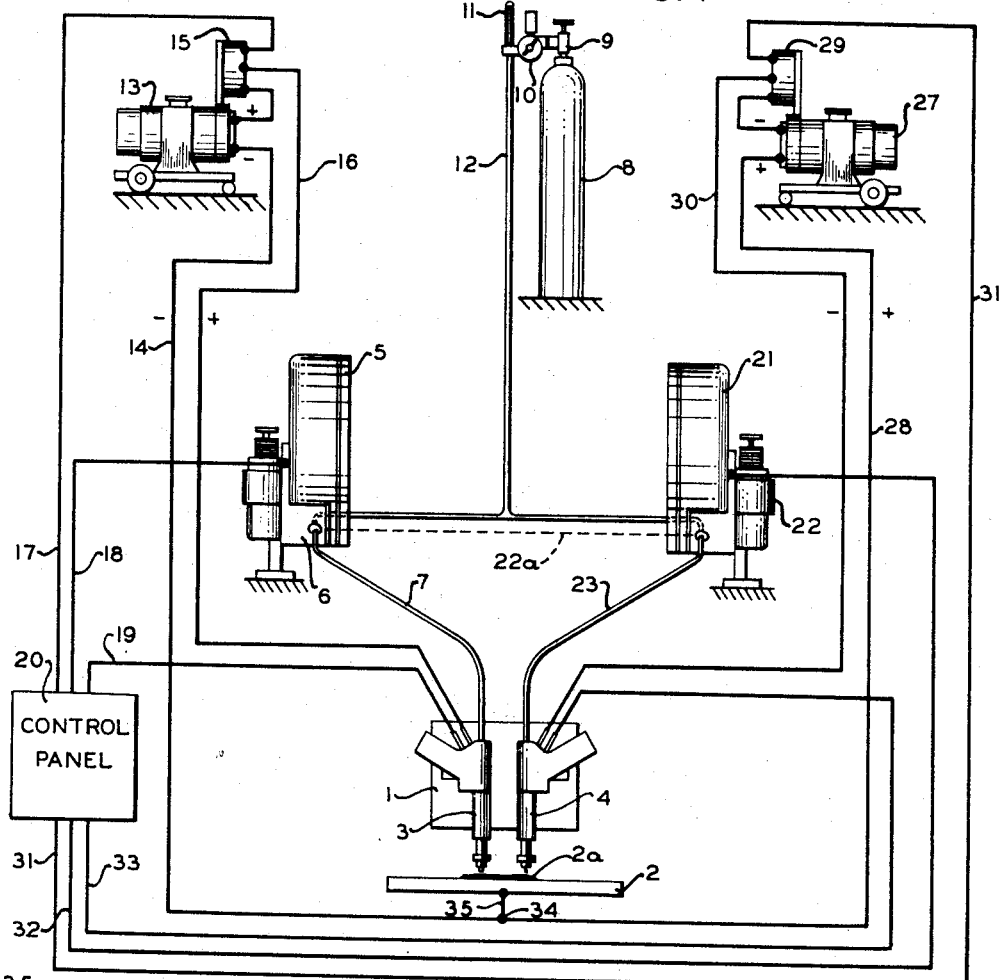
Fig. 1 is a somewhat diagrammatic illustration of one form of welding apparatus embodying the invention.

There is shown in this figure, somewhat diagrammatically, a welding machine which may be of any suitable conventional construction, and which includes a frame 1 movable relative to a workpiece 2. Two welding guns 3 and 4 are mounted on the frame 1 in side by side relation. The two guns are spaced apart by a distance not greater than the weld band deposited by one gun, so that the two guns together deposit an integral, substantially double width band, or overlay, of weld metal on the workpiece. Such an overlay is shown at 2a. The welding guns 3 and 4 are preferably of the inert gas shielded type, provided with consumable wire electrodes and automatic feeding mechanisms for the electrode wires. Complete welding apparatus of this general type is disclosed in the U.S. patents to Muller et al. No. 2,504,868, Muller No. 2,694,763, Muller No. 2,694,764, and Turbett No. 2,727,970. Only those parts of the conventional welding apparatus will be described herein which are considered necessary to a complete understanding of the present invention. For a more complete description of the conventional welding apparatus, reference is made to the issued patents mentioned above.

Consumable electrode wire is fed to the gun 3 from a reel 5 by an associated motor driven feed mechanism 6. The electrode wire passes from the feed mechanism 6 to the gun 3 through a flexible casing 7.

Shielding gas, i.e., helium or argon, is supplied from a high pressure gas cylinder 8 equipped with a cylinder valve 9, a pressure reducing valve 10, and a flow meter 11. A conduit 12 carries the gas to the end of the casing 7 at the feed mechanism 6. The welding current for the gun 3 is provided by a conventional D.C. welding machine 13. One terminal of the welding machine 13 is connected directly to the workpiece 2 by a conductor 14, a junction 34, and a conductor 35. The other terminal is connected through a contactor 15 and a conductor 16 to the welding gun 3.

Control cables 17, 18 and 19, shown diagrammatically as single wires, extend from a central control panel 20 to the contactor 15, the feed mechanism 6 and the gun 3 respectively, for the purpose of controlling the flow of welding current, the electrode wire feed and the supply of inert gas, respectively.

The arc produced at the welding gun 3 is of reverse polarity, i.e., the workpiece serves as the cathode for the arc. The arc at the welding gun 4, however, is of the opposite or straight polarity in that the electrode wire serves as a cathode. The current supply, electrode wire supply and the gas supply for the welding gun 4 are the same as for the welding gun 3. When using an inert gas shielded consuming electrode arc welding process satisfactory operation can be obtained by following the teaching of the previously referred-to Muller et al. Patent No. 2,504,868. This is a reverse polarity process and the reverse polarity arc struck from the electrode of welding gun 3 to the plate 2 is therefore preferably operated according to the teaching of said Muller et al. patent. However, unless some special provision is made, the straight polarity arc struck from the electrode of welding gun 4 to the work will not function satisfactorily. The wire burn-off rate will be excessive and the weld metal transfer globular, resulting in short-circuiting, spatter, disruption of the shielding gas envelope and a generally poor quality weld. To overcome these difficulties with the straight polarity arc, it is necessary to resort to the teaching of the aforementioned Muller Patent No. 2,694,763. According to the teaching of this patent, the wire burn-off rate and the metal transfer of the straight polarity arc can be made substantially identical to that of the reverse polarity arc by the appropriate addition to the arc of a substance comprising a metal selected from the group consisting of the alkali, alkaline earth, and rare earth metals. While these arc additions can be made in several forms, it is preferred for the purposes of the present invention to add these materials in the form of superficial additions to the electrode wire. Accordingly, all reference hereinafter to the electrode wire used in welding gun 4 in the direct current series arc process (the straight polarity arc) is to be understood to mean an electrode wire having a superficial coating of an emissive agent as taught by Muller Patent No. 2,694,763.

The above described specially treated consumable electrode wire is fed to the gun 4 from a reel 21 by an associated motor driven feed mechanism 22. The electrode wire passes from the feed mechanism 22 to the gun 3 through a flexible casing 23. The feed mechanisms 6 and 22 may be synchronized, either by use of a common motor to drive them or by synchronizing two motors, to keep the feed rates equal, or substantially so. This synchronism is indicated in the drawings by the dotted line 22a.

Shielding gas, i.e., helium or argon, is supplied to the gun 4 from the cylinder 8 and its associated equipment through conduit 12 and the casing 23. The welding current for the gun 3 is provided by a conventional D.C. welding machine 27. One terminal of the welding machine 27 is connected directly to the workpiece 2 by a conductor 28, junction 34, and a conductor 35. The other terminal is connected through a contactor 29 and a conductor 30 to the welding gun 4.

Control cables 31, 32 and 33 extend from the central control panel 20 to the contactor 29, the feed mechanism 22 and the gun 4 respectively, for the purpose of controlling the flow of welding current, the electrode wire feed and the supply of inert gas, respectively.

Operation

Under starting conditions the electrical potential across the arc gap between the electrode of welding gun 3 and the work 2 is the open circuit potential of welding generator 13. The electrical potential across the arc gap between the electrode of welding gun 4 and the work 2 is the open circuit potential of generator 27. It may be readily seen that either arc may start independently of the other since each has a complete electrical circuit without dependence on the other. Thus, where heretofore it had been necessary for one electrode to complete its circuit to the workpiece before a starting potential was available to start the arc to the second electrode and starting the arc to the first electrode was dependent on the completion of the circuit through the second electrode, a system is now provided where either arc may start immediately upon contact of the electrode with the work. Thus, should the electrode of gun 3 make contact with the work 2 before the electrode of gun 4 makes contact with the work 2, an arc may immediately be established from the electrode of gun 3 since an arc starting potential is available from the generator 13 through conductors 14 and 16. Initiation of this arc in no way affects the potential still available from generator 27 to start the arc between the electrode of gun 4 and the work where that electrode makes contact with the work. After the arcs have become established, the currents in the two arcs are substantially equal. The impedances of the two arcs are substantially equal, so that there is no potential difference between the terminal 34, which represents the common terminal of the two generators 13 and 27, and the workpiece 2. The current in conductor 35 as a result of the two arcs is substantially zero as it is the algebraic sum of the equal and opposite currents of the two arc circuits. The current for the welding arcs flows through the guns 3 and 4 and the workpiece 2, without passing through the conductor 35. The current through each arc is therefore the same as through the other arc, and the deposits of weld metal at the two arcs are substantially equal.

If, for any reason the conditions at one arc as to heat dissipation, penetration of the weld, are different from the conditions at the other arc, the system can be compensated by varying the current supplied by one generator to balance the conditions at its associated arc. Under such conditions, there will be a difference current flow through the neutral conductor 35. Conversely if it is deemed essential that the two arcs operate with identical currents means may be provided to open the circuit of conductor 35 after the arcs have been started.

FIGURE 2

Figure 2:
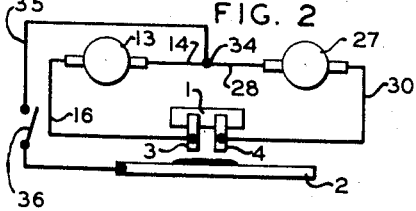
Fig. 2 is a simplified wiring diagram of the arc current circuits in the apparatus of Fig. 1.

Fig. 2 is a wiring diagram of the system of Fig. 1 simplified to illustrate the particular point of novelty of the invention. As there shown, it may be seen that the arcs at the guns 3 and 4 are supplied by separate D.C. generators 13 and 27 which provide a common source of welding current having like components of voltage connected so that their polarities are cumulative, and that a neutral wire 35 connects an intermediate voltage of said common source of voltage at the common terminal 34 of those generators to the workpiece 2. With this circuit arrangement, each arc can start independently although the two arcs, after both have started, are series-connected arcs. A neutral wire interrupting switch 36, which may be manually or automatically operated is provided for use in those circumstances where the arc currents must be identical.

FIGURE 3

This figure illustrates an embodiment of the invention in which alternating current is used to supply the twin series-connected arcs. In this embodiment, the alternating current supply goes through a transformer 38 having a primary winding 39 and a secondary winding 40. The secondary winding 40 has a center tap 41 connected through a conductor 51 to the workpiece 2. The twin arcs connected in series between the end terminals of transformer winding 40 are consequently supplied from a common source of alternating voltage having in phase components of voltage connected so that their polarities are cumulative and conductor 51 is connected to an intermediate voltage of said common source of voltage. The frame 1 and the welding guns 3 and 4 are counterparts of the elements bearing the same reference numerals in Fig. 1. As in the case of Fig. 1, each of the arcs at the guns 3 and 4 is capable of starting independently of the other arc. When only one arc is operating a substantial current will flow through the neutral lead 51. When both arcs are running and the conditions of the arcs are balanced, as will normally be the case, the two arcs are connected in series across the end terminals of the secondary winding 40 and there is little or no current in the conductor 51. For a satisfactory method of operation of the A.C. arcs in an inert atmosphere reference should be made to Muller Patent No. 2,694,764.

FIGURE 4

Figure 4:
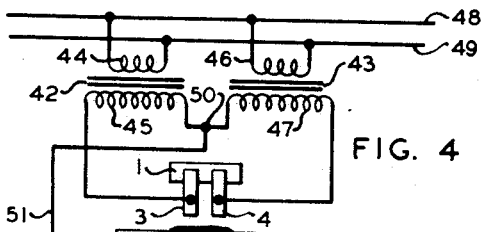
Figs. 3 and 4 are simplified wiring diagrams similar to Fig. 2, showing modified forms of welding apparatus embodying the invention.
Figure 3:
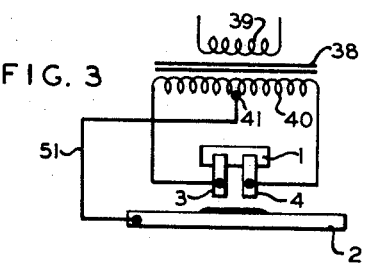

This figure illustrates a modified form of alternating current supply system utilizing two transformers 42 and 43. The transformer 42 has a primary winding 44 and a secondary winding 45. The transformer 43 has a primary winding 46 and a secondary winding 47. The primary windings 44 and 46 are connected across single phase supply lines 48 and 49. The secondary windings 45 and 47 are connected in series aiding at a common terminal 50. The opposite terminals of the secondary windings 45 and 47 are connected to the weld guns 3 and 4. The operation is similar to that in Fig. 3. In Fig. 4, it is essential that both transformer primary windings be connected to the same single phase supply in order to eliminate any current flow in the common wire 51 under balanced conditions.

While the invention has been shown and described as applied to surface welding with the inert gas shielded arc welding process, it is to be understood the invention is also applicable to all consumable electrode arc processes for seam welding and other arc working applications, as well as overlay work. Other modifications thereof will readily occur to those skilled in the art and it is to be understood that the invention is not limited to the particular forms disclosed but may be used in other ways without departure from its spirit as defined by the following claims.

I claim:

1. In the method of electric arc welding in which two series connected welding arcs are maintained between separate electrodes and a common workpiece, the improvement which comprises electrically connecting said electrodes to the end terminals of a common source of welding current having like components of voltage connected at an intermediate terminal of said source so that their polarities are cumulative and electrically connecting said common workpiece to said intermediate terminal of said source of welding current supplying said arcs whereby said arcs may be independently started by current supplied by said components of voltage of said common source of welding current.

2. A method of starting two series connected electric welding arcs formed between separate continuously fed high electrical conductivity consumable electrode wires and a common workpiece which comprises completing the electrical circuit for each arc independently of the other by providing a conductive path of low resistance between said common workpiece and the electrical center of a source of welding current having like components of voltage connected at said electrical center so that their voltages are cumulative for supplying welding current to said arcs in series.

3. Electric arc welding apparatus comprising a source of welding current having an electrical center between like components of voltage connected so that their polarities are cumulative between terminals of opposite polarity, means for introducing welding current of one polarity from one terminal of said source into a first consumable electrode wire, means for introducing welding current of opposite polarity from the other terminal of said source into a second consumable electrode wire, means for feeding both said consumable electrode wires toward a common workpiece at rates to maintain welding arcs between each of said wires and said common workpiece as metal is transferred across said arcs from said electrodes to said workpiece, and electrical conductor means interconnecting said common workpiece and said electrical center of said source of welding current whereby each of said arcs can be started independently of the other.

4. Electric arc welding apparatus comprising a source of welding current having terminals of opposite polarity, means for introducing welding current of one polarity from one terminal of said source into a first consumable electrode wire, means for introducing welding current of opposite polarity from the other terminal of said source into a second consumable electrode wire, means for feeding both said consumable electrode wires toward a common workpiece at rates to maintain welding arcs between each of said wires and said common workpiece as metal is transferred across said arcs from said electrodes to said workpiece, electrical conductor means interconnecting said common workpiece and the electrical center of said source of welding current whereby each of said arcs can be started independently of the other, and switch mean for interrupting said electrical conductor means after both said arcs have been established.

5. Electric arc welding apparatus comprising two welding guns, means for feeding consuming wire electrodes to the two guns, and means for supplying welding current to said two electrodes, said current supplying means comprising two sources of the same kind of electrical energy connected in series circuit with one another so that their polarities are cumulative, a common terminal connected to both sources, and two opposite end terminals, each connected to one source only, means connecting said end terminals to the respective electrodes of the two guns, and means connecting said common terminal to said workpiece.

6. Welding apparatus as defined in claim 5, in which the two sources of electrical energy supply unidirectional current and said opposite end terminals are of opposite polarity so that one of the arcs operates with straight polarity and one with reverse polarity.

7. Welding apparatus as defined in claim 5, in which both said two sources supply in phase alternating current.

8. Welding apparatus as defined in claim 5, in which said two sources of electrical energy comprise the two halves of a single phase transformer winding having a center tap.

9. Welding apparatus as defined in claim 5, in which said two sources of energy comprise two transformers having secondary windings connected to said welding guns and primary windings connected to the same single phase source of alterating current.

References Cited in the file of this patent

UNITED STATES PATENTS

| | | |
|---|---|---|
| 2,655,586 | Schreiner et al. | Oct. 13, 1953 |
| 2,669,640 | Outcalt et al. | Feb. 16, 1954 |